United States Patent [19]

Hallett

[11] Patent Number: 5,136,197
[45] Date of Patent: Aug. 4, 1992

[54] REACTION CONTAINMENT DRIVE FOR POWER TOOL

[76] Inventor: Clarence Hallett, 2942 Charella Drive, Prince George, B.C., Canada, V1H 1E9

[21] Appl. No.: 720,884
[22] Filed: Jun. 25, 1991
[51] Int. Cl.⁵ .................... H02K 7/12; H02K 7/14; F16D 43/20
[52] U.S. Cl. ......................... 310/83; 310/50; 310/78; 475/263
[58] Field of Search ............. 310/47, 50, 83, 114, 310/115, 78; 475/263, 264, 265; 29/27 B

[56] References Cited

U.S. PATENT DOCUMENTS

| | | | |
|---|---|---|---|
| 4,375,047 | 2/1983 | Nelson et al. | 310/114 |
| 4,528,470 | 7/1985 | Young et al. | 310/78 |
| 4,614,134 | 9/1986 | Bohle | 475/263 |
| 5,027,023 | 6/1991 | Koivikko | 310/83 |
| 5,080,642 | 1/1992 | Takami | 475/263 |

*Primary Examiner*—Steven L. Stephan
*Assistant Examiner*—D. Rebsch
*Attorney, Agent, or Firm*—Douglas E. White

[57] ABSTRACT

A reaction containment drive apparatus for a power tool includes a motor having an outside case free to rotate within the tool casing, and an internal drive shaft. A planetary gear set is an integral portion of the drive. It has three parts, namely, a central sun gear part, a middle planet gear part (the planet gear part having a planet carrier and preferably three planet gears on the planet carrier), and an outside ring gear part coaxial with the sun gear part and the planet carrier. The planet gear part is rotatable between the sun gear part and the ring gear part. One part of the planetary gear set is fixedly connected to the drive shaft and rotatable as a unit therewith; one part of the planetary gear set (for example, the ring gear) is fixedly connected to the outside case of the motor and rotatable as a unit therewith; and the remaining part of the planetary gear set is fixedly connected to the output shaft of the tool and forces the output shaft to rotate as a unit therewith when power is supplied to the motor. The reaction containment drive contains reaction forces within itself and prevents such forces from being transmitted from the output shaft to the tool.

19 Claims, 2 Drawing Sheets

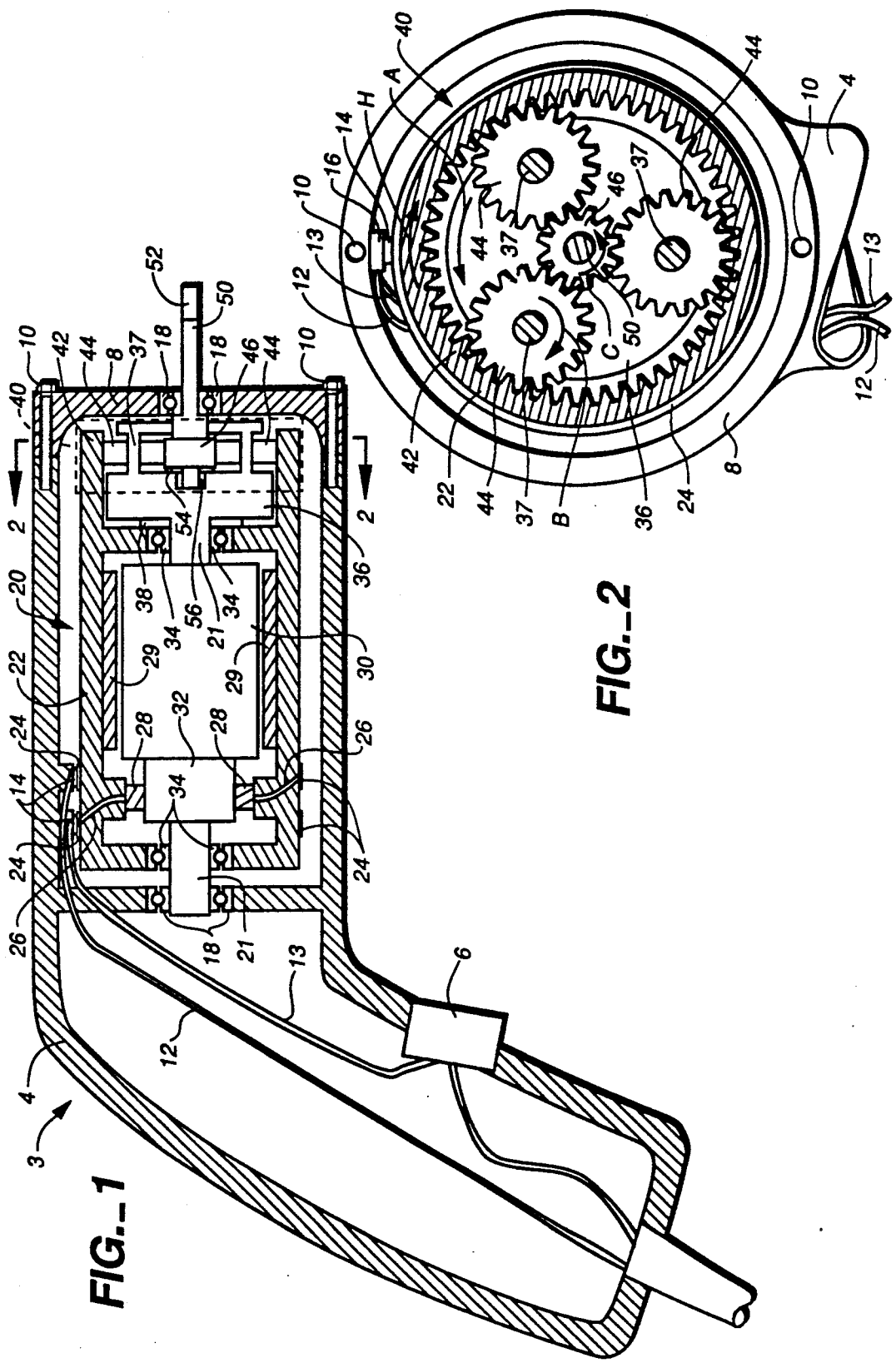

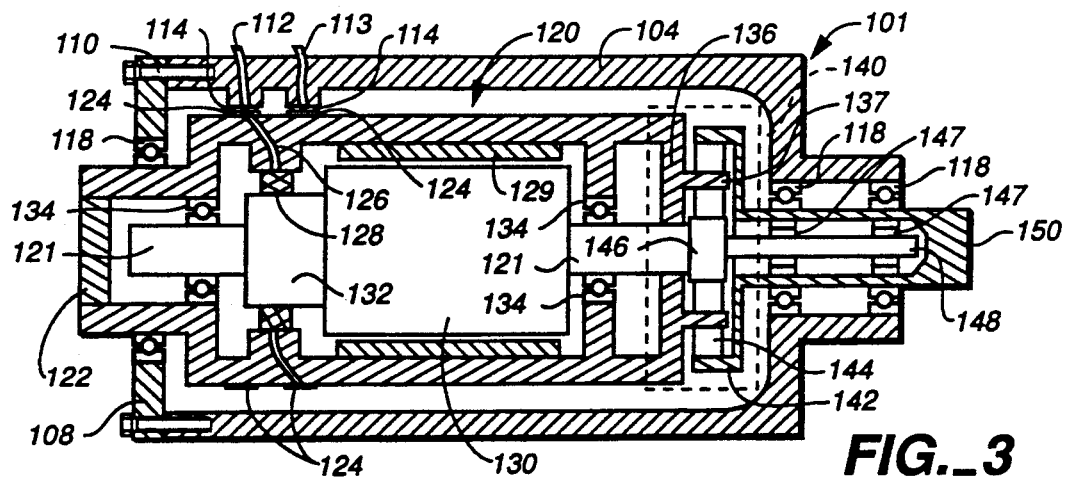
FIG._3
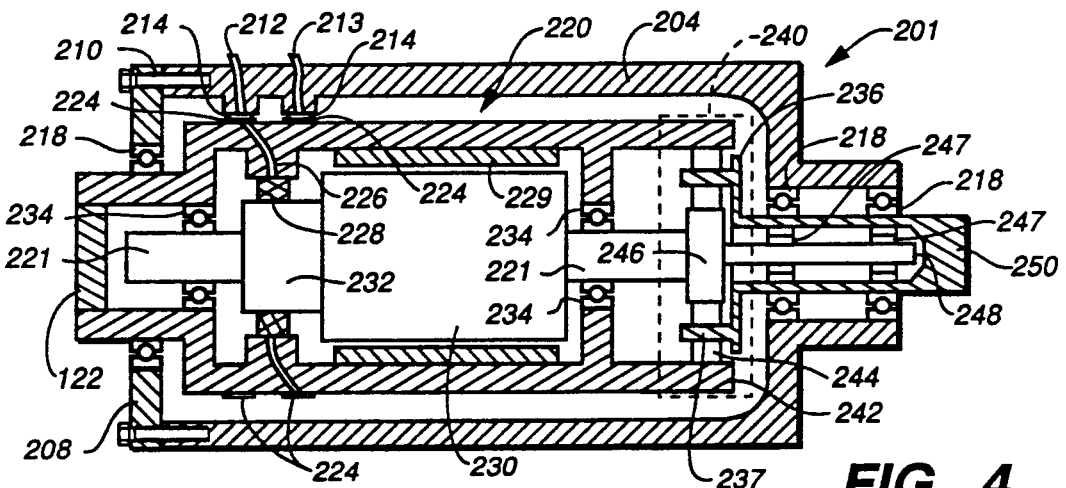
FIG._4
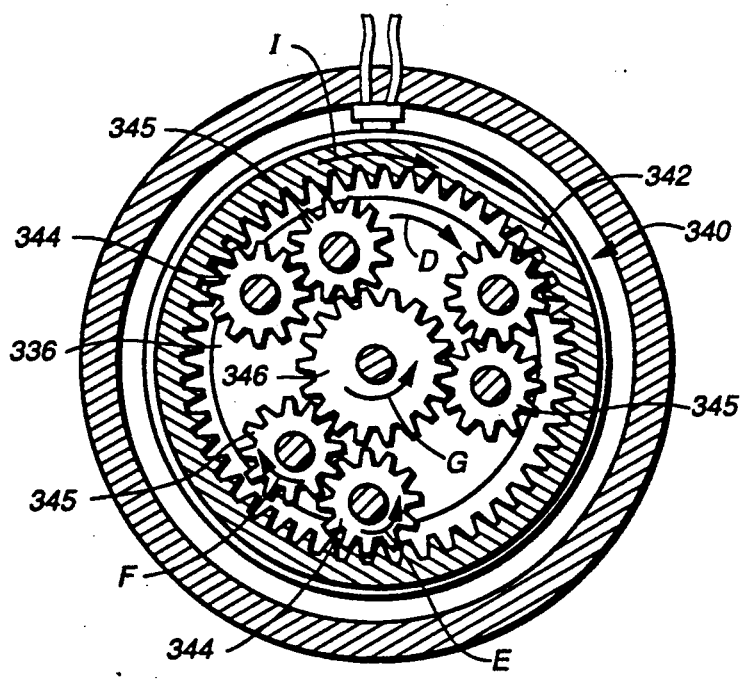
FIG._5

REACTION CONTAINMENT DRIVE FOR POWER TOOL

FIELD OF THE INVENTION

This invention relates to drive units, more particularly to a motor drive unit which uses a novel integration of a motor and a planetary gear set to contain reaction forces within the drive.

BACKGROUND OF THE INVENTION

Motors generate twisting reaction forces (reverse torque) which are transmitted to their associated mounting brackets. With reference to hand held power tools, these forces may cause operation of the tool to become inefficient, uncomfortable or even unsafe.

An electric motor consists of an armature and an outside case. The armature is part of the motor's drive shaft and will be referred to herein as the action member. The outside case of the motor is separate from the armature and will be referred to as the reaction member. In prior art configurations, the outside case of the motor is mounted solidly within the tool casing. The armature is caused to turn when electricity is supplied to the motor. The reaction forces are then directly transmitted from the outside case of the motor to the tool casing, where they are contained by the mounting brackets of the tool.

With existing portable hand drills, the hand of the operator is actually the mounting bracket. The reaction forces can be felt by the operator as a twisting effort. The twisting effort (or the reaction force) will be equal to the effort at the drill bit (or the action force).

Planetary gear sets are known to be useful as reduction gear sets and for other power transmission purposes, but have not heretofore been used to eliminate undesirable reaction forces in motor-driven tools.

Prior developments in this field may be generally illustrated by reference to the following patents:

| Patent No. | Patentee | Issue Date |
| --- | --- | --- |
| 3,134,275 | R. Davison | May 26, 1964 |
| 2,591,967 | H. Ridgely et al. | Apr. 08, 1952 |
| 1,151,381 | N. Olson | Aug. 24, 1915 |
| 2,826,095 | B. Dirzius et al. | Mar. 11, 1958 |
| 3,204,489 | K. Furukawa et al. | Sep. 07, 1965 |
| 4,901,602 | H. Matoba | Feb. 20, 1990 |
| 2,582,698 | E. Hirvonen | Jan. 15, 1952 |
| 2,899,850 | J. Selby et al. | Aug. 18, 1959 |

U.S. Pat. No. 3,134,275 shows a hand held power tool which utilizes planetary gears to couple the electric motor to the output member. The outside case of the motor 24 of this device is rigidly connected to the tool casing 12. Therefore, the reaction forces of the motor are transmitted to the tool 10 in the traditional manner.

U.S. Pat. Nos. 2,591,967 and 1,151,381 teach other sun gear and planet gear assemblies. Neither teach a configuration which would isolate the reaction forces of a drive motor from an associated power tool.

U.S. Pat. No. 2,826,095 shows a rotating head for a drill which incorporates a planetary gear arrangement. An arm 25 transfers reaction forces or torque (col. 2, lines 3-7) from the planetary gear set to the tool (in this case a drill press 12) rather than isolating them from the tool.

The rest of the patents are representative of what is in the art.

SUMMARY OF THE INVENTION

The present invention comprises a reaction less drive unit—a mechanical drive which contains the reaction forces within itself. Insofar as the drive does produce reaction forces, but which forces also contribute to the power at the output shaft, the device will be referred to herein as a "reaction containment drive." The reaction containment drive will be particularly useful in hand tools and other applications where the twist of reaction is undesirable or dangerous.

This device consists of a power source, such as an electric or hydraulic motor (or any rotary motor), and a planetary gear set. The motor and planetary gear set are coupled together in such a way that the forces of reaction are kept within the drive. While the planetary gear set is known, the proposed reaction-containing configuration is novel. In effect, the planetary gear set and the electric motor become one unit, instead of two units coupled together.

A planetary gear set consists of three main parts: a center gear called the sun gear; a middle gear set called the planet gears; and an outside gear called the ring gear. There are usually three planet gears. They are solidly mounted in a planet carrier, but they do turn on their mounting posts. The planet gears and carrier are treated as one part of the planetary set. The ring gear, planet carrier and the sun gear are all coaxial.

Power is transmitted through the set when any one part of the set is driven and any other part is held solid or static. The remaining part of the planetary set then becomes the output member of the reaction containment drive.

In the reaction containment drive, the outside case (reaction member) of the motor is solidly attached to the part of the planetary set that is chosen in a particular configuration to be the "solid" part, relatively speaking. Actually no member of the drive, nor part of the gear set, is mounted solid or prevented from turning with respect to the casing of the tool. Instead, the entire motor and planetary gear set assembly is mounted on bearings so that it is free to turn within the tool casing. The reaction member of the drive unit transmits the reaction forces to the output member. If the action member is said to push the output member, then the reaction member pulls it as well. Since all the forces are contained within the drive, there is no twist or reaction felt by the operator of the device.

In one preferred unit (see the discussion of FIG. 3 below), the armature (action member) of an electric motor is connected to the sun gear (input part) of the planetary set. The outside case (reaction member) of the electric motor is attached to the planet carrier group (solid or static part). The ring gear (output part or member) may be used to drive a drill bit or the like.

Regardless of the configuration, the basic theory remains the same. When the reaction member of the electric motor, or other primary power source, is attached to any part of the planetary gear set and the action member is attached to any other part of the same gear set, both the action and the reaction forces are contained within the drive. There is a resultant bias to the output part of the planetary gear set that is available to do useful work.

The unique quality of the reaction containment drive is the fact that the planetary gear set is integrated with a drive motor instead of being connected to it. The drive motor and planetary gear set are one unit. Because of this construction, both the action and the reaction forces combine to deliver power to the output shaft.

FEATURES AND ADVANTAGES

An object of this invention is to disclose, in a power tool of the type which has a tool casing and a rotatable output shaft, a reaction containment drive apparatus which includes a motor having an outside case free to rotate within the tool casing and an internal rotatable drive shaft; and further includes a planetary gear set having three parts, namely a central sun gear part, a middle planet gear part, and an outside ring gear part. The planet gear part is rotatable between the sun gear part and the ring gear part. The planetary gear set connects the drive shaft of the motor to the output shaft of the tool.

A further object is to disclose such a drive wherein one part of the planetary gear set is fixedly connected to the drive shaft and rotatable together therewith as a unitary action member, wherein one part of the planetary gear set is fixedly connected to the outside case of the motor and rotatable together therewith as a unitary reaction member, and wherein the remaining part of the planetary gear set is fixedly connected to the output shaft of the tool and forces the output shaft to rotate together therewith as a unitary output member when power is supplied to the motor.

Preferably, the planetary gear set has three planet gears as a feature thereof.

Still another feature is rotational bearing means between the tool casing and the outside case of the motor and between the outside case of the motor and the drive shaft. Additional bearings are provided where advantageous.

Yet another feature of the reaction containment drive is means for providing power to the motor as its outside case rotates within the tool casing. The power providing means includes a pair of conductive annular slip rings extending around the outside circumference of the outside case of the motor and a pair of conductive brushes, each brush being continuously connected to one of the slip rings as the outside case rotates within the tool casing.

Another feature is an apparatus which is easy and safe to use and is suitable for mass production at relatively low cost.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, the words "upwardly," "downwardly," "leftwardly," and "rightwardly" will refer to directions in the drawings to which reference is made. The words "inwardly" and "outwardly" will refer to directions toward and away from, respectively, the geometric center of a device and designated parts thereof.

BRIEF DESCRIPTION OF THE DRAWING

FIG. 1 is a schematic sectional elevation of a portable hand drill, showing a first reaction containment of this invention;

FIG. 2 is a sectional side elevation of the drill of FIG. 1, taken along line 2—2 of FIG. 1;

FIG. 3 is a schematic sectional elevation of a second reaction containment drive;

FIG. 4 is a schematic sectional elevation of a third reaction containment drive; and FIG. 5 is a sectional side elevation of an alternate planetary gear set which may be used with the embodiments of this invention.

| Drawing Reference Numerals | |
|---|---|
| A | arrow |
| B | arrow |
| C | arrow |
| D | arrow |
| E | arrow |
| F | arrow |
| G | arrow |
| H | arrow |
| I | arrow |
| 1 | reaction containment drive |
| 3 | tool |
| 4 | casing of 3 |
| 6 | switch on 4 |
| 8 | cover of 4 |
| 10 | screw for 8 |
| 12 | electrical wire |
| 13 | electrical wire |
| 14 | primary brush |
| 18 | support bearing on 4 |
| 20 | motor |
| 21 | shaft of 20 |
| 22 | outside case of 20 |
| 24 | slip ring for 14 |
| 26 | wire connector for 24, 28 |
| 28 | brush of 20 |
| 29 | field shoe of 20 |
| 30 | armature of 20 |
| 32 | commutator on 30 |
| 34 | support bearing on 22 for 30 |
| 36 | planet carrier for 40 on 30 |
| 37 | post on 36 for 44 |
| 38 | thrust bearing between 22, 36 |
| 40 | planetary gear set |
| 42 | ring gear of 40 on 22 |
| 44 | planet gear |
| 46 | sun gear on 50 |
| 50 | output shaft |
| 52 | chuck mount area of 50 |
| 54 | thrust bearing between 36, 46 |
| 56 | pilot bearing between 36, 50 |
| 101 | reaction containment drive |
| 104 | tool casing |
| 108 | cover of 104 |
| 110 | screw for 108 |
| 112 | electrical wire |
| 113 | electrical wire |
| 114 | primary brush |
| 118 | support bearing on 104 |
| 120 | motor |
| 121 | shaft of 120 |
| 122 | outside case of 120 |
| 124 | slip ring for 114 |
| 126 | wire connector for 124, 128 |
| 128 | brush of 120 |
| 129 | field shoe of 120 |
| 130 | armature of 120 |
| 132 | commutator on 130 |
| 134 | support bearing on 122 for 130 |
| 136 | planet carrier for 140 on 122 |
| 137 | post on 136 for 144 |
| 140 | planetary gear set |
| 142 | ring gear of 140 on 150 |
| 144 | planet gear |

| | -continued |
|---|---|
| | Drawing Reference Numerals |
| 146 | sun gear on 121 |
| 147 | pilot bearing |
| 148 | extension of 121 |
| 150 | output shaft |
| 201 | reaction containment drive |
| 204 | tool casing |
| 208 | cover of 204 |
| 210 | screw for 208 |
| 212 | electrical wire |
| 213 | electrical wire |
| 214 | primary brush |
| 218 | support bearing on 204 |
| 220 | motor |
| 221 | shaft of 220 |
| 222 | outside case of 220 |
| 224 | slip ring for 214 |
| 226 | wire connector for 224, 228 |
| 228 | brush of 220 |
| 229 | field shoe of 220 |
| 230 | armature of 220 |
| 232 | commutator on 230 |
| 234 | support bearing on 222 for 230 |
| 236 | planet carrier for 240 on 250 |
| 237 | post on 236 for 244 |
| 240 | planetary gear set |
| 242 | ring gear of 240 on 222 |
| 244 | planet gear |
| 246 | sun gear on 221 |
| 247 | pilot bearing |
| 248 | extension of 221 |
| 250 | output shaft |
| 336 | planet carrier for 340 |
| 340 | planetary gear set |
| 342 | ring gear of 340 |
| 344 | planet gear |
| 345 | intermediate planet gear |
| 346 | sun gear |

DESCRIPTION OF PREFERRED EMBODIMENTS

Referring to FIG. 1, there is illustrated therein a reaction containment drive 1 of this invention. The drive 1 is shown incorporated into a tool 3, namely a portable hand drill, but it could be used in any of a number of tools which utilize a rotating output member to do useful work.

The tool 3 has a casing 4, from which casing it is desired to eliminate reaction forces that tend to twist the tool when it is in the hand of the user. A standard power switch 6 controls the drill. A removable cover 8 may be held onto the casing 4 by means of screws 10. Electrical wires 12, 13 run from the power cord and the switch 6, respectively, to the primary brushes 14 of the electrical motor 20. These wires, together with the slip rings 24 discussed below, constitute means for supplying power to the motor.

The motor, including its outside case 22, may rotate within the tool casing 4, being only held therein by means of the rotational support bearings 18. These bearings cradle the drive shaft 21 of the motor and the output member 50.

As stated, the outside case 22 (reaction member) of the motor 20, unlike prior art motor cases, is free to rotate within the tool 3. It is supported on the motor shaft 21 by means of the rotational bearings 34. A pair of electrically conductive annular slip rings 24 extend around the outside circumference of the outside case 22. As the case 22 rotates, the slip rings 24 serve to continuously connect, by means of wires 26, the conductive primary brushes 14 to the internal motor brushes 28. Part 29 represents the field shoe of the motor. The motor brushes 28 power the commutator 32 of the armature 30. The motor's drive shaft 21, as in the existing art, is a fixed part of the armature 30 (action member) of the motor.

Generally, one part of a three-part planetary gear set will be fixedly connected to the armature (action member) of the motor, another part of the gear set (the "solid" part thereof) will be fixedly connected to the outside case of the motor (the reaction member), and the third part of the gear set (the output member) will be available for useful work.

In this embodiment, the armature 30, more properly the drive shaft 21, is fixedly and integrally connected to the planet carrier 36 of the planetary gear set 40. The planet gears 44 rotate on posts 37 attached to the planet carrier. This makes the planet gears 44 the input part of the gear set, and, together with the armature, the action member of the drive. They are forced to rotate within a ring gear 42, which ring gear is an integral part of the motor case 22 (together, the reaction member). The ring gear is therefore considered the solid part of the set in this embodiment. The central sun gear 46 thus becomes the output part of the planetary set and, together with the output shaft 50 to which it is fixedly attached, becomes the output member of the drive. The output shaft terminates in an area configured in this embodiment as a drill bit chuck mount 52.

The output shaft 50 rotates about pilot bearings 56 in the planet carrier and about support bearings 18 in the cover 8 of the tool casing 4. The planet carrier 36 is freed to rotate against the motor case 22 through thrust bearings 38. The sun gear 46 is supported against axial thrust by bearings 54. It is to be understood that the bearings, the gears, and other common parts of the tool 3 are merely drawn schematically in this and other figures, for clarity of illustration.

The speed of the individual gears depends on the gear ratio of the planetary set as a whole. One preferred gear ratio is four to one.

Turning to the side elevation of FIG. 2, it can be seen how the reaction containment drive 1 contains the reaction forces within itself. The armature 30 of the electric motor 20 drives the planet carrier 36 in, say, a counter-clockwise direction, as indicated by arrow A. This forces the planet gears 44 to turn clockwise within the ring gear 42 (arrow B). In turn, the sun gear 46 and the output shaft 50 are driven counter-clockwise (arrow C) by the planet gears.

The motor case/ring gear turns in a direction opposite to the armature/planet carrier, i.e. clockwise (arrow H). This also forces the planet gears 44 to turn clockwise on their shafts 37 (arrow B). The turning force on the output shaft 50 is therefore a direct result of the rotation of both the action and reaction members. Within the power range of the drive unit the ring gear 42 and the planet carrier 36 turn in opposite directions. Under a very heavy load they turn in the same direction but at different speeds. The drive members will stall under load with a gear ratio of 1 to 1. This relative movement between the planet carrier and the ring gear forces the planet gears 40 to turn on their posts 37 and forces the sun gear 46 and output shaft 50 to turn.

An overdrive and a corresponding loss of torque at the output shaft occurs with this configuration and gear ratio. The power flow is the same regardless of the direction of rotation of the components; thus, the reaction containment drive 1 is fully reversible.

The torque and speed at the output shaft 50 is available without any twisting effort being felt by the user of the drill 3, except for that generated by the friction of the bearings and brushes. This is possible because the output force is a result of both the action and reaction forces. The power curve of any reaction containment drive unit is a function of both the gear ratio of the planetary set and the manner in which it is configured.

FIG. 3 shows a second reaction containment drive 101, in this case illustrated separate from any particular power tool (except for a schematic casing 104). It is to be noted that, for convenience the last two positions of the reference numerals of alternate embodiments of the invention duplicate those of the numerals of the embodiment of FIG. 1, where reference is made to similar or corresponding parts.

A removable cover 108 is held onto the casing 104 by means of screws 110. Electrical wires 112, 113 run to the primary brushes 114 of the electrical motor 120. The motor, including its outside case 122, may rotate within the tool casing 104. The motor is only held therein by means of support bearings 118, which bearings cradle the outside case 122 of the motor and the output member 150.

As stated, the outside case 122 (reaction member) of the motor 120, unlike prior art cases, is free to rotate within the tool casing 104. It supports the motor shaft 121 by means of bearings 134. A pair of annular slip rings 124 extend around the outside circumference of the outside case 122. As the case 122 rotates, the slip rings 124 serve to continuously connect, by means of wires 126, the primary brushes 114 to the internal motor brushes 128. Part 129 represents the field shoe of the motor. The motor brushes 128 power the commutator 132 of the armature 130. The motor's drive shaft 121 is a fixed part of the armature 130 (action member) of the motor.

In this embodiment, the armature 130 (action member), and the drive shaft 121, are fixedly connected to the sun gear 146 of the planetary gear set 140. This makes the sun gear 146 the "input part" of the gear set (as opposed to the planet gears 44 of the embodiment of FIG. 1). The planet gears 144 rotate on posts 137 attached to the planet carrier 136, which planet carrier is an integral part of the motor case 122 (formally "solid part"—as opposed to the ring gear 42 of the embodiment of FIG. 1). The planet gears cause a ring gear 142 to rotate, which ring gear thus becomes the output member of the drive (as opposed to the sun gear 46 of the embodiment of FIG. 1). The ring gear is fixedly attached to the output shaft 150.

The output shaft 150 rotates about support bearings 118 in the tool casing 104. Pilot bearings 147 hold a support shaft 148, which shaft is merely an extension of the drive shaft 121.

FIG. 4 shows a second reaction containment drive 201. A removeable cover 208 is held onto a tool casing 204 by means of screws 210. Electrical wires 212, 213 run to the primary brushes 214 of the electrical motor 220. The motor, including its outside case 222, may rotate within the tool casing 204. The motor is rotatably held therein by means of support bearings 218, which bearings cradle the outside case 222 of the motor and the output member 250.

As in previous embodiments, the outside case 222 (reaction member) of the motor 220 is free to rotate within the tool casing 204. The motor case supports the motor shaft 221 of the armature 230 by means of bearings 234. A pair of annular slip rings 224 extend around the outside circumference of the outside case 222. As the motor case 222 rotates, the slip rings 224 serve to continuously connect the primary brushes 214 to the internal motor brushes 228, by means of wires 226. The field shoe 229 of the motor extends around the armature. The motor brushes 228 power the commutator 232 of the armature 230. The motor's drive shaft 221 is a fixed part of the armature 230 (action member) of the motor.

In this embodiment, the armature 230 (action member) is fixedly connected to the sun gear 246 of the planetary gear set 240. As in the embodiment of FIG. 3, this makes the sun gear 246 the input part of the planetary gear set. The planet gears 244 rotate on posts 237 attached to the planet carrier 236, which planet carrier, unlike in the previous two embodiments, is an integral part of the output shaft 250. It is, therefore, the planet carrier 236 which is the output member of the reaction containment drive 201. As in the device of FIG. 1, it is the ring gear 242 (solid part) which is fixedly attached to the motor case 222. The sun 246 and planet 244 gears cause the planet carrier 236 to rotate, making the output shaft 250 available for useful work.

The output shaft 250 rotates about support bearings 218 in the tool casing 204. Pilot bearings 247 hold a shaft 248 which is a supporting extension of the drive shaft 221.

Other configurations for attaching the motor casing, motor armature, and the tool's output shaft to the planetary gear set are possible, the above three embodiments being presented as representative examples thereof.

FIG. 5 illustrates an alternate planetary gear set 340 which could be substituted for the gear set of any of the previous embodiments. It is to be noted that the gear set 340, like the sets of FIGS. 1-4, is not itself novel—apart from its incorporation in a reaction containment drive as described herein.

As above, any one part of the gear set 340 may be the input part, any other part the output part and the remaining part the solid or static part. Therefore, any description of the turning of the individual gears must be understood to be purely relative. The sun gear 346 turns with an intermediate set of planet gears 345. The intermediate planetary gears turn with an outer set of planet gears 344. The outer set turns with the ring gear 342 and/or the planet carrier 336. One possible set of relative motions is indicated by arrows D-G.

Regardless of the configuration, the basic theory remains the same. When the reaction member of an electric motor, or other primary power source, is attached to any part of a planetary gear set and the action member is attached to any other part of the same gear set, both the action and reaction forces contribute to the force of the output part. The output part of the planetary gear set is available to do useful work without any reaction outside the unit.

While the above provides a full and complete disclosure of the preferred embodiments of this invention, various modifications, alternate constructions, and equivalents may be employed without departing from the true spirit and scope of the invention. Such changes might involve alternate materials, components, structural arrangements, sizes, operational features or the like. Therefore, the above description and illustrations should not be construed as limiting the scope of the invention which is defined by the appended claims.

What is claimed is:

1. In a power tool of the type which has a tool casing and a rotatable output shaft, reaction containment drive apparatus including:
   a motor having
      an outside case free to rotate within the tool casing, and
      an internal rotatable drive shaft; and
   a planetary gear set having three parts, namely
      a central sun gear part,
      a middle planet gear part, and
      an outside ring gear part, the planet gear part rotatable between the sun gear part and the ring gear part,
   wherein
      the planetary gear set connects the drive shaft and the outside case of the motor to the output shaft of the tool.

2. In a power tool of the type which has a tool casing and a rotatable output shaft, reaction containment drive apparatus including:
   a motor having
      an outside case free to rotate within the tool casing, and
      an internal rotatable drive shaft; and
   a planetary gear set having three parts, namely
      a central sun gear part,
      a middle planet gear part, the planet gear part having
         a planet carrier and
         a plurality of planet gears rotatably carried on the planet carrier, and
      an outside ring gear part coaxial with the sun gear part and the planet carrier, the planet gear part rotatable between the sun gear part and the ring gear part,
   wherein
      one part of the planetary gear set is fixedly connected to the drive shaft and rotatable together therewith as a unitary action member,
      one part of the planetary gear set is fixedly connected to the outside case of the motor and rotatable together therewith as a unitary reaction member, and
      the remaining part of the planetary gear set is fixedly connected to the output shaft of the tool and forces the output shaft to rotate together therewith as a unitary output member when power is supplied to the motor.

3. The apparatus of claim 2 wherein:
   the planet gear part is fixedly connected to the drive shaft of the motor.

4. The apparatus of claim 3 wherein:
   the ring gear part is fixedly connected to the outside case of the motor and
   the sun gear part is fixedly connected to the output shaft of the tool.

5. The apparatus of claim 2 wherein:
   the sun gear part is fixedly connected to the drive shaft of the motor.

6. The apparatus of claim 5 wherein:
   the ring gear part is fixedly connected to the outside case of the motor and
   the planet gear part is fixedly connected to the output shaft of the tool.

7. The apparatus of claim 5 wherein:
   the planet gear part is fixedly connected to the outside case of the motor and
   the ring gear part is fixedly connected to the output shaft of the tool.

8. The apparatus of claim 2 wherein:
   there are three planet gears.

9. The apparatus of claim 8 further including:
   rotational bearing means between
      the tool casing and the outside case of the motor and between
      the outside case of the motor and the drive shaft.

10. The apparatus of claim 9 further including:
    means for providing power to the motor as its outside case rotates within the tool casing.

11. The apparatus of claim 10 wherein:
    the motor is electric and
    the power providing means includes
       a pair of conductive annular slip rings extending around the outside circumference of the outside case of the motor and
       a pair of conductive brushes, each brush being continuously connected to one of the slip rings as the outside case rotates within the tool casing.

12. The apparatus of claim 11 wherein:
    the planet gear part is fixedly connected to the drive shaft of the motor.

13. The apparatus of claim 12 wherein:
    the ring gear part is fixedly connected to the outside case of the motor and
    the sun gear part is fixedly connected to the output shaft of the tool.

14. The apparatus of claim 11 wherein:
    the sun gear part is fixedly connected to the drive shaft of the motor.

15. The apparatus of claim 14 wherein:
    the ring gear part is fixedly connected to the outside case of the motor and
    the planet gear part is fixedly connected to the output shaft of the tool.

16. The apparatus of claim 14 wherein:
    the planet gear part is fixedly connected to the outside case of the motor and
    the ring gear part is fixedly connected to the output shaft of the tool.

17. Power tool reaction containment drive apparatus including:
    a tool casing;
    a rotatable output shaft;
    a motor having
       an outside case free to rotate within the tool casing, and
       an internal rotatable drive shaft;
    means for supplying power to the motor as its outside case rotates within the tool casing; and
    a planetary gear set having three parts, namely
       a central sun gear part,
       a middle planet gear part, the planet gear part having
          a planet carrier and
          three planet gears on the planet carrier, and
       an outside ring gear part coaxial with the sun gear part and the planet carrier, the planet gear part rotatable between the sun gear part and the ring gear part,
    wherein
       one part of the planetary gear set is fixedly connected to the drive shaft and rotatable together therewith as a unitary action member,
       one part of the planetary gear set is fixedly connected to the outside case of the motor and rotatable together therewith as a unitary reaction member, and the remaining part of the planetary gear set is fixedly connected to the output shaft and forces the output shaft to rotate together therewith as a unitary output member when power is supplied to the motor by the power supplying means.

18. The apparatus of claim 17 wherein:
 the planet gear part is fixedly connected to the drive shaft of the motor.
19. The apparatus of claim 17 wherein:
 the sun gear part is fixedly connected to the drive shaft of the motor.

* * * * *